UNITED STATES PATENT OFFICE 2,802,790

PAINT REMOVER COMPOSITION

Souren Z. Avedikian, Westchester County, N. Y.

No Drawing. Application May 5, 1954,
Serial No. 427,867

2 Claims. (Cl. 252—154)

This invention relates to a paint remover composition. More particularly it relates to a composition having a substantial amount of water and capable of being flushed off the treated surface by a stream of water.

Many paint and varnish removers employ methylene chloride. In fact Ellis U. S. 2,327,701 discloses the use of methylene chloride in such compositions, and W. W. Groves British 485,857 as early as 1937 described the use of methylene chloride in paint removers.

None of the prior art effective paint remover compositions contained substantial amounts of water, nor did they employ ammonia, pyridine or pyridine derivatives to produce a commercially successful flush-off composition.

According to this invention a flush-off paint-remover composition having an ammonia or pyridine base is capable of being prepared with substantial amounts of water, much more water than previously was believed to be feasible. The water is bodied into this inventive composition to form a homogeneous mass. The bodied water of this composition behaves as a bridge in the subsequent union with the flushing water to permit rapid and effective flush off. Prior art compositions having little or negligible amounts of water are not as effectively washed off the treated surfaces.

The composition is therefore not only more effective than prior art compositions but because of the considerable amounts of water present they are clearly less expensive.

An illustrative example of applicant's paint remover composition using ammonia is as follows:

| | Grams |
|---|---|
| Methylene chloride | 730 |
| Methanol | 80 |
| Naphtha (flash pt. 105° F.) | 50 |
| Methyl cellulose (4,000 centipoises) | 24 |
| Ammonium salt of sulfated castor oil | 40 |
| Paraffin M. Pt. 124° F. to 145° F. | 20 |
| Ammonia (aqua) 28% concentration | 200 |
| Water | 100 |

The over-all composition is prepared by pouring the methylene chloride in a container, adding the naphtha and the paraffin thereto and mixing until the paraffin is dissolved. Next the methyl cellulose is added and the mass is stirred until completely wet. Then the methanol is added slowly with stirring until all the methyl cellulose is dissolved. Next the sulfated castor oil is dissolved with stirring and finally the ammonia is added with constant stirring followed by the addition of the water. The over all stirred composition is a smooth cream. It is applied to the paint and allowed to remain for several minutes whereupon it is flushed off leaving a clean base surface.

In the above composition the sulfated castor oil behaves as an emulsifier and the methyl cellulose increases the viscosity of the composition. But both the sulfated castor oil and the methyl cellulose assist in the uniform retention of the water in the creamy composition giving the water-bodied effect thereto.

The nature of the ingredients in the above-composition can be somewhat varied since carboxymethyl cellulose may be used in lieu of methyl cellulose. Also the flash point of the naphtha (oils of the saturated paraffin series) may vary from 80° F. to 150° F. Furthermore the amount of the ingredients may vary, thus the amount of methyl cellulose may vary from 12 to 48 grams, the sulfated castor oil may vary from 20 to 80 grams, the paraffin may vary from 10 to 40 grams, the 28 percent aqua ammonia may vary from 20 to 200 grams, and the amount of water may vary from 280 to 100 grams.

I have also discovered that pyridine could be used in lieu of aqua ammonia in the above formulation. An effective pyridine composition was found to be as follows:

| | Grams |
|---|---|
| Methylene chloride | 73.0 |
| Methanol | 8.0 |
| Naphtha (flash point 105° F.) | 5.0 |
| Methyl cellulose (4,000 centipoises) | 2.4 |
| Ammonium salt of sulfated castor oil | 4.0 |
| Paraffin (M. P. 124–145° F.) | 2.0 |
| Pyridine | 2.0 |
| Water | 28.0 |

The procedure for preparing the creamy composition is like that given above for aqua ammonia. The pyridine composition is also highly effective against all types of paints and varnishes. In the above composition the ammonium salt of sulfated castor oil may be varied from 2 to 8 grams, the paraffin may be varied from 1 to 4 grams, the pyridine may be varied from 1 to 8 grams and the water may be varied from 22–29 grams.

A third composition was prepared using 2 methyl-5 ethyl pyridine in lieu of pyridine and was found to be substantially as effective as pyridine.

Other substituted pyridines such as alpha-picoline, lutidine and the like also give effective flush off paint remover compositions.

Of particular interest is the fact that the compositions of this invention are effective against baked-on synthetic enamels such as the urea-formaldehyde, melamine-formaldehyde and others. Paint removers of the prior art are generally ineffective against such synthetic vitreous surface films or coatings. Not only is applicant's composition capable of effectively attacking baked-on synthetic enamels, a feature often lacking in prior art compositions, but the attacked enamel can be easily flushed off because of the natural tendency of the water containing compositions to unite with the flush-water.

The amount of water in the composition may vary quite widely but about 20 percent water is advantageous, though composition having 15 to 25 percent water give good results. Even over 25 percent water may be used in special instances.

This invention has been disclosed by means of several illustrative examples but clearly its scope is more generic as shown in the claims herein.

I claim:

1. A homogeneous creamy paint remover composition consisting of 730 grams methylene chloride, 80 grams methanol, 50 grams naphtha (flash pt. 105° F.), 25 grams methyl cellulose, 40 grams ammonium salt of sulfated castor oil, 20 grams paraffin (M. P. 124° F. to 145° F.), 200 grams 28 percent aqua ammonia, and 100 grams water.

2. A homogeneous emulsified paint remover composition comprising 730 grams methylene chloride, 12 to 48 grams methyl cellulose, 80 grams methanol, 50 grams naphtha (flash pt. 80° F. to 150° F.), 20 to 80 grams ammonia salt of sulfated castor oil, 10 to 40 grams paraffin (M. P. 124° F. to 145° F.), 20 to 200 grams of 28 percent aqua ammonia, and 280 to 100 grams of water.

References Cited in the file of this patent

UNITED STATES PATENTS

| | | |
|---|---|---|
| 1,204,851 | Denegre | Nov. 14, 1916 |
| 1,572,839 | Blair | Feb. 9, 1926 |
| 2,388,082 | Roediger | Oct. 30, 1945 |
| 2,418,138 | Packer | Apr. 1, 1947 |
| 2,433,517 | Kuentzel | Dec. 30, 1947 |

FOREIGN PATENTS

| | | |
|---|---|---|
| 485,857 | Great Britain | May 20, 1938 |

OTHER REFERENCES

Chemical Formulary, Bennett, Chem. Pub. Co., N. Y., vol. 9 (1951), pages 416–417.